United States Patent
Bixler et al.

[15] 3,696,511
[45] Oct. 10, 1972

[54] BELT MEASURING DEVICE

[72] Inventors: William L. Bixler, Littleton; Harold C. Voss, Denver, both of Colo.

[73] Assignee: The Gates Rubber Company, Denver, Colo.

[22] Filed: April 23, 1971

[21] Appl. No.: 136,689

[52] U.S. Cl. .............................. 33/125 R, 33/143 R
[51] Int. Cl. ............................................... G01b 5/00
[58] Field of Search .33/125 R, 143 R, 143 D, 143 C, 33/143 E, 174 R

[56] References Cited

UNITED STATES PATENTS

| | | | |
|---|---|---|---|
| 1,066,826 | 7/1913 | Lewis | 33/125 R X |
| 1,816,695 | 7/1931 | Pope | 33/125 R |
| 2,044,983 | 6/1936 | Hedgpeth | 33/125 R |
| 2,241,979 | 5/1941 | Case | 33/125 R |
| 2,336,594 | 12/1943 | Burkhard | 33/125 R |

*Primary Examiner*—Robert B. Hull
*Assistant Examiner*—Charles E. Phillips
*Attorney*—Raymond Fink, H. W. Oberg, Jr. and Curtis H. Castleman, Jr.

[57] ABSTRACT

A device for establishing an outside circumference identification for V-belts. The device includes two semi-cylindrical members reciprocally separable from each other along a stick which has its length divided into a plurality of scales. An arcuate stepped reference on one of the members provides means for gauging the top width of a plurality of V-belts. A pointing means in cooperation with the stepped reference indicates a circumference or specified belt identification on the scales.

4 Claims, 2 Drawing Figures

PATENTED OCT 10 1972 3,696,511

INVENTOR
WILLIAM L. BIXLER
HAROLD C. VOSS
BY H.H. Oberg Jr
ATTORNEY 3,696,511

BELT MEASURING DEVICE

BACKGROUND OF THE INVENTION

The invention relates to geometrical instruments for measuring the circular size of flexible bands, but more particularly, the invention relates to a device for measuring the outside circumference of V-belts of various top widths and thickness.

Power transmission belts or V-belts are classified according to top width, outside circumference, and angle. For example, most automotive belts have a 36° nominal angle and standard top widths of essentially ⅜ in. (9.5 mm), 7/16 in. (11 mm) and ½ in. (12.5 mm). Belts of different top widths have different nominal thickness. Nominal belt thickness for belts of a given top width typically varies between belt manufacturers. When old or worn belts are to be replaced, it is common practice to measure the outside circumference and top width of belt and then find a corresponding replacement belt from a catalog.

Belt circumference is typically measured by devices which divide an upright belt into two semi-circular arcs of known length and two straight sections of determinable length. As belts of different top widths have different and sometimes variable thickness, some devices have a scale pointer moveable in response to belt thickness. Such a device is disclosed by U. S. Pat. No. 2,336,594 as issued to Burkhard. Other devices compensate for belt thickness variations by providing two sheave halves for receiving belts and dividing them into one of a plurality of semi-circular arcs. A plurality of scale reference marks are provided that compensate for length variations between the plurality of semi-circular arcs. After a belt has been divided into arcs and straight sections, the outside circumference is read from a scale divided into standard length units. Where a sheave type measuring device is used, care must be taken to insure that tension in both straight sections are the same as it is possible to wedge one belt straight section in the sheave halves and measure an improper belt length. Although the available belt measuring devices give a reasonable length measurement when used properly, a possibility of introducing further error is introduced when a plurality of belt width and length measurements are converted through a reference table to identify a specific belt by a character reference or product number.

SUMMARY OF THE INVENTION

In accordance with the invention, a belt measuring device is provided which includes two oppositely oriented semi-cylindrical members that are reciprocally separable along a calibrated stick. The semi-cylindrical members and stick provide a means for dividing an inverted V-belt into two generally semi-circular arcs of known length and two straight sections of determinable length. An arcuate stepped portion is provided along the circumferential edge of one semi-cylindrical member as a gauge for measuring a plurality of belt widths. A scale or a plurality of belt identification characters are provided along the stick for each step of the stepped portion. Belt outside circumference or a character code for a particular belt is read directly.

Accordingly, an object of the invention is to provide a device for measuring the outside circumference of one of a class of belts while minimizing the probability of introducing measuring errors.

Another object of the invention is to provide a device that directly identifies a belt or a group of belts by a character code such as a product number.

Another object of the invention is to provide a gauge which measures the outside circumference of a V-belt by scaling the inside circumference of an inverted V-belt.

Still another object of the invention is to provide a gauge for accurately classifying belts of different top widths by the sense of touch or feel.

These and other objects or advantages of the invention will become apparent by reviewing the drawings and description thereof wherein.

DESCRIPTION OF PREFERRED EMBODIMENT

Figure 1:
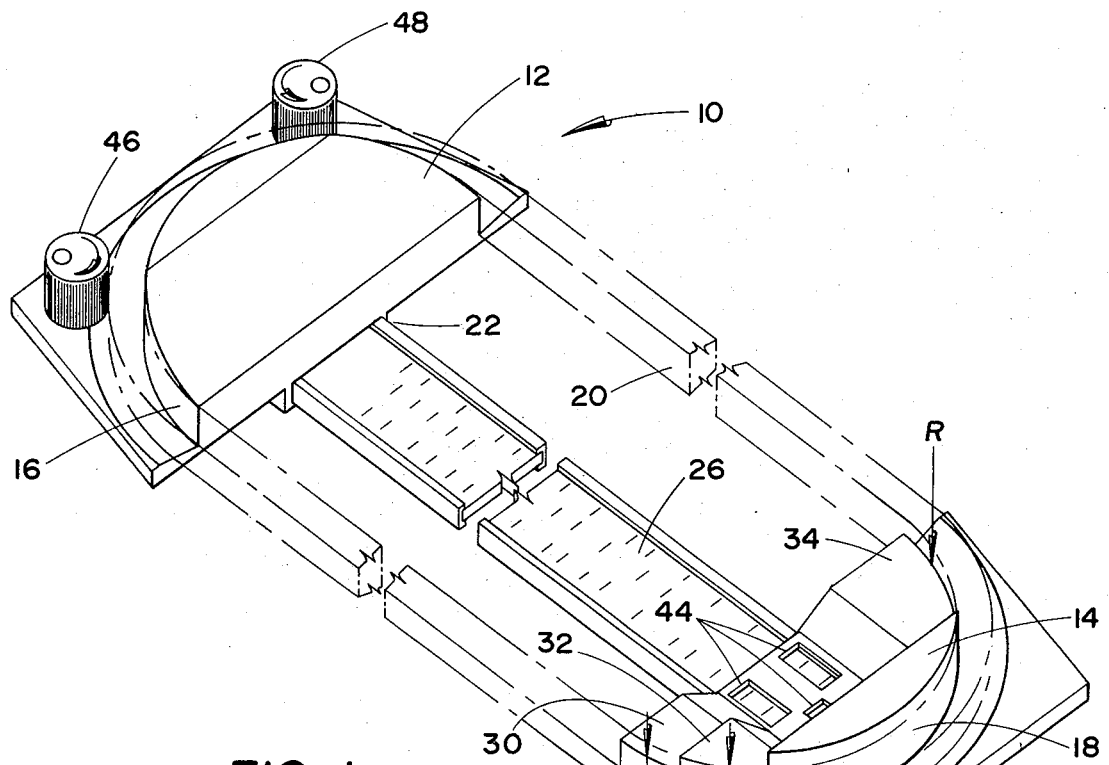
FIG. 1 is a broken isometric view of a device of the invention.
Figure 2:
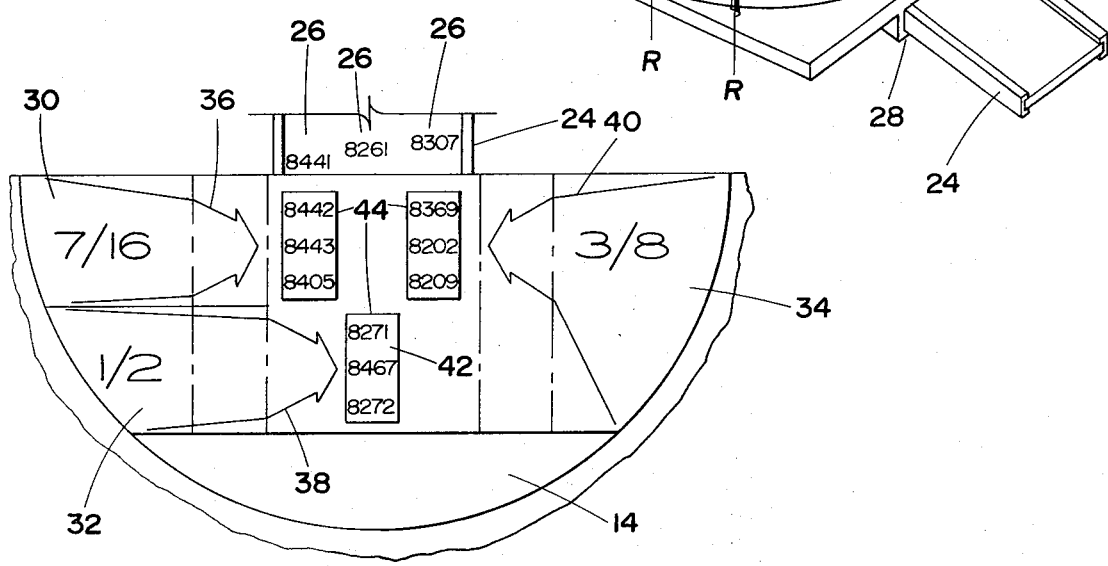
FIG. 2 is an enlarged partial view of FIG. 1.

Referring to the drawings, a V-belt measuring gauge 10 is provided in accordance with the invention.

First 12 and second 14 generally semi-cylindrical members are arranged to have their arcuate or convex surfaces 16, 18 oppositely oriented in relation to each other. The arcuate surfaces 16, 18 are of known or predetermined length and are adapted to receive a curved portion of an inverted V-belt 20. One of the semi-cylindrical members 12 is rigidly attached to near one 22 end of a stick 24. The stick 24 is divided into a plurality of scales 26 or belt identification characters which will be later explained. The second semi-cylindrical member 14 is attached 28 to reciprocally move along the stick 24. An arcuate stepped reference 30, 32, 34 is provided along the curved surface of at least one of the semi-cylindrical members 14 as a means for gauging the top width of a plurality of V-belts.

The rise R of each step is of predetermined height from a datum surface, shown in FIG. 1 as the surface immediately adjacent the arcuate surface 18, and corresponds to the top width for a standard V-belt. For example, the first step 30 may have a rise of 7/16 in. (11 mm), the second step 32 a rise of ½ in. (12.5 mm), and the third step 34 a rise of ⅜ in. (9.5 mm). Any number of steps of having different rises may be used and a stepped reference may be additionally provided along the curved surface of the other cylindrical member 12. Preferably, the stepped reference is chosen to apply to a particular group of belts such as automotive or industrial.

From each step 30, 32, 34 of the reference, an indicator 36, 38, 40 leads to a scale pointer for indicating belt outside circumference. Where it is desired to measure belt length in standard units such as inches or millimeters, only one scale is provided on the stick. However, it is preferred to provide a scale on the stick for each step of the reference and to have the scale arranged as a list of numbers, groups or characters where each group or character identifies a specific belt of given top width and length. For example, the characters may be a V-belt product number for a particular manufacture. By directly identifying a V-belt replacement from the scale of the stick, the problem of looking up a belt identification from a reference table or catalog is avoided. Thus, opportunity of introducing error in identifying a replacement V-belt by measuring a worn or old V-belt is avoided.

Where a worn or used V-belt is measured to identify a replacement belt therefor, the used belt 20 is inverted and placed over the semi-cylindrical members 12, 14. The belt is moderately tensioned by sliding the moveable member 14 along the stick 24. Thus, the belt is divided into two arcs of known length and two straight sections of determinable length. The cumulative length of the arcs and straight sections is determined by means of the scale 26.

A V-belt is constructed having an undercord, an overcord, and a tensile section sandwiched therebetween. The undercord is the radially inward portion of the belt. For belts of a standard top width, it is common to have considerable variations in belt undercord thickness between belt manufacturers. However, the degree of variation of the belt overcord is less prevalent between belt manufacturers for a belt of standard top width.

When a belt is inverted, it inverts about its tensile section. The outside surface of the belt overcord is displaced radially inward from its original or normal position an amount equaling two times the overcord thickness. Accordingly, as the belt is inverted, the outside circumference is reduced an amount equal to four pi times the overcord thickness. For belts of the same top width, a small change in circumference is accounted for by slightly shifting the scale. Thus, by inverting a belt, an accurate measurement may be made of its outside circumference.

Belts of different top width typically have different belt overcord thicknesses. The differences in thickness are significant and must be accounted for on the scale. To this end, separate pointers 36, 38, 40 may be provided for each belt top width for use with one scale; or a plurality of scales may be provided, one for each belt top width. Preferably, a separate scale 26 is provided for each belt top width that is to be measured.

Referring now particularly to FIG. 1, belt top width is calibrated by means of the stepped reference 30, 32, 34. The belt being measured is positioned next to the stepped reference. The top width of the belt is determined by feeling the edge of the belt and comparing it to the steps. For example, the belt 20 shown has a top width corresponding to step 32. A pointer 36, 38, 40 leads from each step 30, 32, 34 of the reference for indicating belt circumference on the scale 26.

When a plurality of scales are used, it is desirable to have them arranged as a list of belt identification characters 42 which individually identify a separate replacement belt. Thus, a replacement belt may be directly identified without the problem of converting a belt length and top width measurement to a set of belt identification characters through a catalog or the like.

ADDITIONAL SPECIES

Generally, as most belts are used they are stretched considerable amounts. Stretching is normal and is most often accommodated for during belt usage by a movable sheave of a belt drive. The circumferential length change caused by stretching may by far overshadow any inaccuracies of belt measurement introduced by the device itself. In fact, the device may exactly measure the outside circumference of a belt for the purpose of identifying a replacement belt. But because of belt stretching, the replacement belt identified is too long. It has been found to be advantageous to provide a window 44 that brackets a plurality of belt identification characters 42 to indentify two or more replacement belts. Should the used belt be stretched, the characters identifying the shorter replacement belt would be chosen.

Oftentimes a broken belt must be measured. The broken ends present the problem of how to properly retain the belt around the semi-cylindrical sections 12, 14 while a measurement is being made. Two eccentric knobs 46, 48 are provided near the convex surface of one semi-cylindrical member 12 to retain the broken ends of a belt. When rotated, the eccentric knobs 46, 48 wedge and grip the belt in cooperation with the curved surface of the semi-cylindrical member 12. Once the broken ends of the belt are retained, a length measurement may be made.

The foregoing detailed description was made for purpose of illustration only and is not intended to limit the scope of the invention which is to be determined from the appended claims.

What is claimed is:

1. A gauge for establishing an outside circumference identification for inverted V-belts of various top widths, comprising:
    a first generally semi-cylindrical member;
    a stick fixedly attached near one end to said first member, said stick having its length divided by a plurality of scales;
    a second generally semi-cylindrical member attached to said stick for reciprocal movement relative toward and away from said first semi-cylindrical member, said members arranged to have oppositely oriented convex surfaces adapted for receiving an inverted V-belt and dividing it into two curved portions and two straight portions at least one of said semi-cylindrical members having means providing a datum surface for registration with one edge of the top width of said belt;
    a means for gauging the top width of a V-belt comprising; a plurality of stepped arcuate portions located and formed along the curved surface of at least one semi-cylindrical member about which the belt passes, the rise of each step being of a predetermined height relative to said datum surface whereby the top width of the inverted V-belt may be compared with the plurality of stepped arcuate portions; and
    means in cooperation with said gauging means for pointing a measured V-belt outside circumference identification on the scales.

2. A gauge as set forth in claim 1 wherein each of said scales include an array of characters which identify a V-belt of predetermined top width and outside circumference.

3. A gauge as set forth in claim 2 wherein said pointer means brackets a plurality of characters whereby the measured V-belt may be identified with a plurality of characters that represent V-belts of predetermined top width and outside circumference.

4. A gauge as set forth in claim 1 and further including a means for gripping and holding broken ends of a V-belt against one of said semi-cylindrical members.

* * * * *